US006983978B2

(12) United States Patent
Radu et al.

(10) Patent No.: US 6,983,978 B2
(45) Date of Patent: Jan. 10, 2006

(54) MODULAR AUTOMOTIVE DOOR TRIM PANEL CONSTRUCTION

(75) Inventors: Bogdan Radu, Dearborn, MI (US); Alan G. Dry, Gross Point Woods, MI (US)

(73) Assignee: Lear Corporation, Southfield, MI (US)

( * ) Notice: Subject to any disclaimer, the term of this patent is extended or adjusted under 35 U.S.C. 154(b) by 84 days.

(21) Appl. No.: 10/709,544

(22) Filed: May 12, 2004

(65) Prior Publication Data

US 2005/0253416 A1 Nov. 17, 2005

(51) Int. Cl.
*B60J 5/00* (2006.01)

(52) U.S. Cl. .............................. 296/146.7; 296/146.5; 49/502

(58) Field of Classification Search ............ 296/146.5, 296/146.7; 49/502
See application file for complete search history.

(56) References Cited

U.S. PATENT DOCUMENTS 4,923,542 A * 5/1990 Janicki et al. ................ 49/502
5,419,606 A * 5/1995 Hull et al. ............... 296/146.7
5,805,402 A 9/1998 Maue et al. .................. 361/93
5,878,532 A 3/1999 Kavanagh et al. ............ 49/380
5,904,002 A 5/1999 Emerling et al. ............. 49/502
5,927,021 A 7/1999 Kowalski et al. ............. 49/502
5,934,729 A * 8/1999 Baack ..................... 296/146.7
5,975,622 A * 11/1999 Koopman, Jr. ........... 296/146.5
6,000,959 A 12/1999 Curtindale et al. ......... 439/247
6,101,765 A 8/2000 Hashimoto et al. ........... 49/502
6,123,385 A 9/2000 Bailey et al. ............ 296/146.7
6,139,088 A 10/2000 Okamoto et al. ........ 296/146.6
6,149,224 A 11/2000 Tiberia et al. ........... 296/146.7
6,176,542 B1 1/2001 Gooding et al. ......... 296/146.6
6,196,607 B1 * 3/2001 Gulisano ................. 296/146.7
6,378,931 B1 * 4/2002 Kolluri et al. ......... 296/146.15
6,381,906 B1 5/2002 Pacella et al. ................ 49/502
6,416,113 B1 * 7/2002 Page ........................... 49/502
6,422,640 B2 7/2002 Whitehead et al. ...... 296/146.7
6,493,919 B2 12/2002 Morrison et al. ............. 29/434
6,562,275 B1 5/2003 Martinez .................... 264/308
6,615,546 B2 9/2003 Furuyama et al. ............ 49/502
6,626,482 B2 9/2003 Barr et al. ............... 296/146.7
6,659,536 B1 12/2003 Chamberlain et al. ... 296/146.5
6,669,267 B1 12/2003 Lynam et al. ............ 296/146.5
6,676,195 B1 1/2004 Marriott et al. .......... 296/146.7
6,899,373 B2 * 5/2005 Kim ........................ 296/146.7
6,932,416 B2 * 8/2005 Clauson ................... 296/146.7
2001/0030444 A1 10/2001 Whitehead et al. ...... 296/146.7
2002/0125734 A1 9/2002 Pokorzynski et al. .... 296/146.7
2003/0097798 A1 * 5/2003 Staser ......................... 49/502

* cited by examiner

*Primary Examiner*—Lori L. Coletta
(74) *Attorney, Agent, or Firm*—Wood, Herron & Evans, L.L.P.

(57) ABSTRACT

An automotive door assembly comprises a door frame, an interior trim panel removably secured to the door frame by a plurality of connecting members, and one or more door accessories disposed between the door frame and the interior trim panel and connected to the door frame and interior trim panel by the connecting members. The connecting members include first engagement portions that fixedly attach the door accessories to the door frame, and second engagement portions that releasably attach the door frame and door accessories to the trim panel. The door accessories are initially supported on the interior trim panel for assembly onto the door frame when the trim panel is installed on the door frame. Thereafter, the door accessories remain fixed to the door frame when the trim panel is removed.

15 Claims, 3 Drawing Sheets

MODULAR AUTOMOTIVE DOOR TRIM PANEL CONSTRUCTION

CROSS-REFERENCE

The present invention is related to U.S. Ser. No. 10/710,276, filed Jun. 30, 2004 and U.S. Ser. No. 10/711,119, filed Aug. 25, 2004.

FIELD OF THE INVENTION

The present application relates generally to automotive interiors, and more particularly to an automotive interior door trim assembly.

BACKGROUND OF THE INVENTION

Conventional automotive doors are manufactured in a modular fashion wherein an outer skin, or exterior panel, is secured to one side of a structural door frame, and an interior trim panel is secured to the opposite side of the door frame to define an interior space therebetween. To facilitate assembly in a manufacturing line environment, various door accessories may be mounted to the interior trim panel prior to securing the trim panel to the door frame so that the door accessories will be properly positioned on the door frame in a single manufacturing step. After the door accessories are in place on the door frame, additional fasteners, such as threaded fasteners, are installed to more securely attach the door accessories to the door frame. In order to install these additional fasteners, and to provide access to the interior of the door for service, conventional interior trim panels are provided with an access opening and a removable access panel, or bolster, covering the opening.

The access opening must be large enough to permit assemblers or service technicians to access the door accessories while the interior trim panel remains fixed to the door frame. Large access openings tend to weaken the interior trim panel and restrict styling options for the panel. Moreover, access to door accessories which are remote from the access opening is often cumbersome, requiring the use of additional fasteners installed directly through the interior trim panel. For example, manufacturers often secure an audio speaker directly to the door frame by fasteners installed through the interior trim panel. After the fasteners have been installed, a speaker grille is typically applied to the interior trim panel to hide the fasteners from view.

Requiring a separate bolsters and cover items such as a speaker grilles increases manufacturing cost and time to assemble the door. In addition, seals between the bolster and grille and the interior trim panel are typically required to reduce and/or eliminate wind and road noise from entering the passenger compartment. Providing these seals and applying them to the bolster and trim further increases manufacturing cost and time. A need therefore exists for an automotive door assembly which addresses various drawbacks of the prior art, such as those discussed above.

SUMMARY OF INVENTION

The present invention provides an automotive door assembly comprising a door frame, a trim panel removably secured to the door frame, and one or more door accessories secured to the door frame and interior trim panel in the space therebetween. The door assembly further includes connecting members disposed between the interior panel and the door frame to couple the interior trim panel and door accessories to the door frame. The connecting members have first engagement portions configured to be fixedly attached to the door frame, and second engagement portions configured to be releasably coupled to the trim panel.

During assembly, the door accessories are initially supported on the interior trim panel, whereby the first engagement portions of the connecting members are coupled to the door accessories, and the second engagement portions of the connecting members are releasably coupled to the trim panel. When the trim panel is installed on the door frame, the second engagement portions of the connecting members fixedly engage the door frame. When the interior trim panel is subsequently removed from the door frame by disengagement from the second engagement portions, the connecting members and door accessories remain firmly secured to the door frame.

In another embodiment of the invention, a door trim assembly for and automobile includes an interior door trim panel, as described above, for supporting one or more door accessories prior to initial installation on a door frame, and connecting members having first and second engagement portions that facilitate firmly securing the door accessories to the door frame such that the door accessories remain secured to the door frame after the trim panel is removed.

In yet another embodiment, a method of assembling an automotive door includes positioning a door accessory on an interior door trim panel, releasably securing the door accessory to the trim panel, coupling the trim panel to a door frame such that the door accessory is fixedly secured to the door frame, separating the trim panel from the door frame while retaining the door accessory on the door frame, and further securing the door accessory to the door frame with a fastener.

The features and objectives of the present invention will become more readily apparent from the following Detailed Description taken in conjunction with the accompanying drawings.

BRIEF DESCRIPTION OF DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
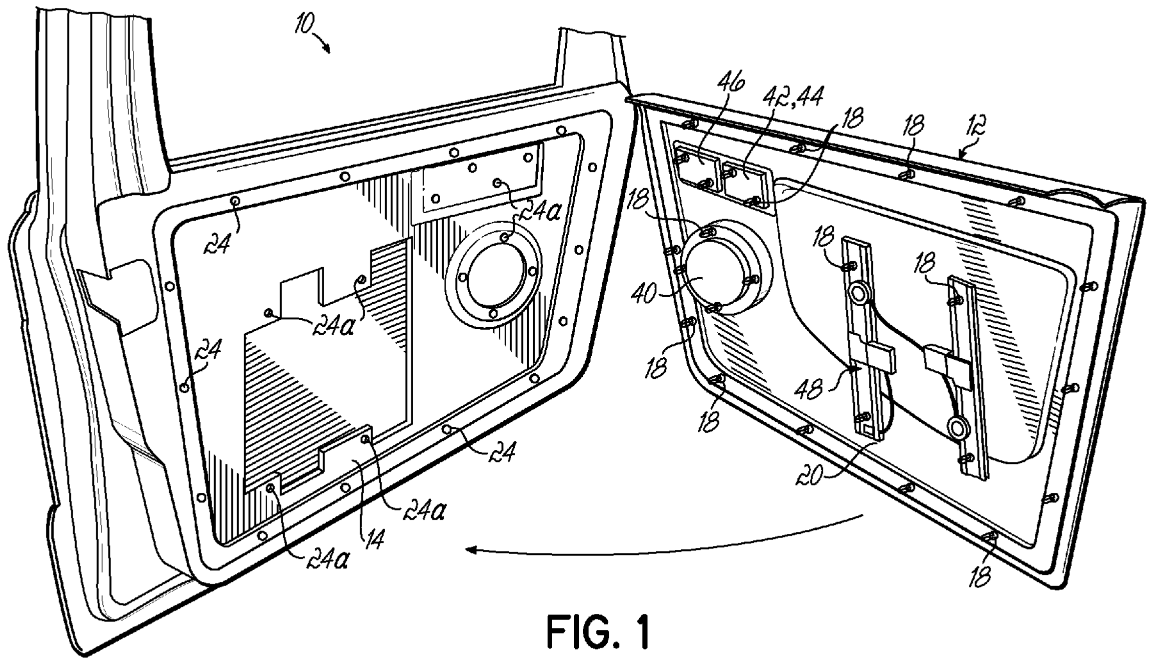
FIG. 1 is a perspective view depicting an automobile door assembly, including an interior trim panel according to the present invention.
Figure 4A:
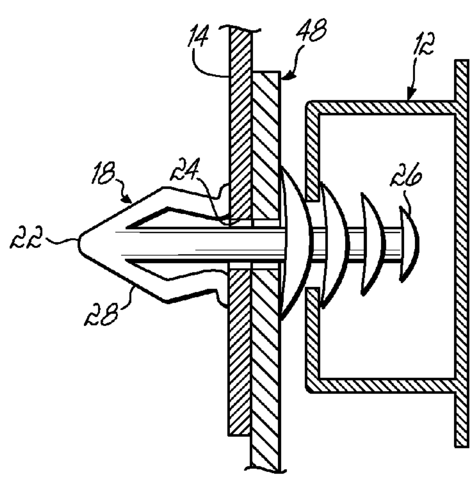
FIG. 4A is a partial cross-sectional view of the door assembly of FIG. 2, taken along lines 4A—4A.
Figure 4B:
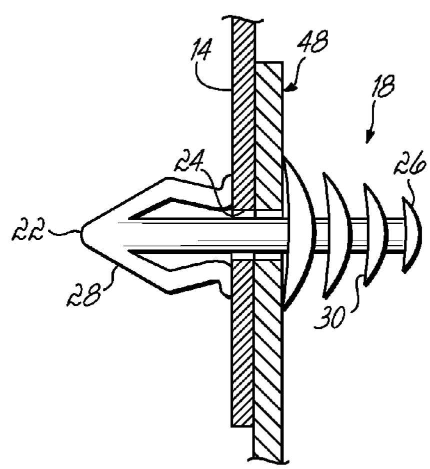
FIG. 4B is a partial cross-sectional view of the door assembly of FIG. 3, taken along lines 4B—4B.

Referring to FIG. 1, there is shown an automotive door assembly 10 including an interior trim panel 12 according to the present invention. The trim panel 12 is configured to be installed to an interiorly facing or inboard side 14 of a door frame 16 and is depicted in this figure prior to initial installation to the door frame 16. The trim panel 12 is supported on the door frame by several connecting members 18 secured to the interior trim panel 12 and extending outwardly from an outboard-facing side surface 20 thereof. Each connecting member 18 includes a first engagement portion 22 which extends outwardly from the interior trim panel 12 to engage corresponding apertures 24 formed into the door frame 16, as best shown in FIGS. 4A–4B. The connecting members 18 further include a second engagement portion 26 that is releasably attached to the interior door trim panel 12.

The connecting member 18 depicted in FIGS. 4A and 4B has a first engagement portion 22 including resilient, outwardly extending fingers 28 which are compressed when the first engagement portion 22 is installed through apertures 24 in the door frame 16. The fingers 28 spring outwardly once they pass through apertures 24 to firmly engage the door frame 16 and thereby prevent the connecting member 18 from being removed from the door frame 16. The second engagement portion 26 includes a series of parallel, spaced, resilient discs 30 having successively decreasing diameters such that the connecting member 18 tapers in a direction toward the distal end of the second engagement portion 26. This tapered arrangement is often referred to as a "Christmas tree" configuration and facilitates removably securing the second engagement portion 26 in a properly sized aperture.

Figure 5:
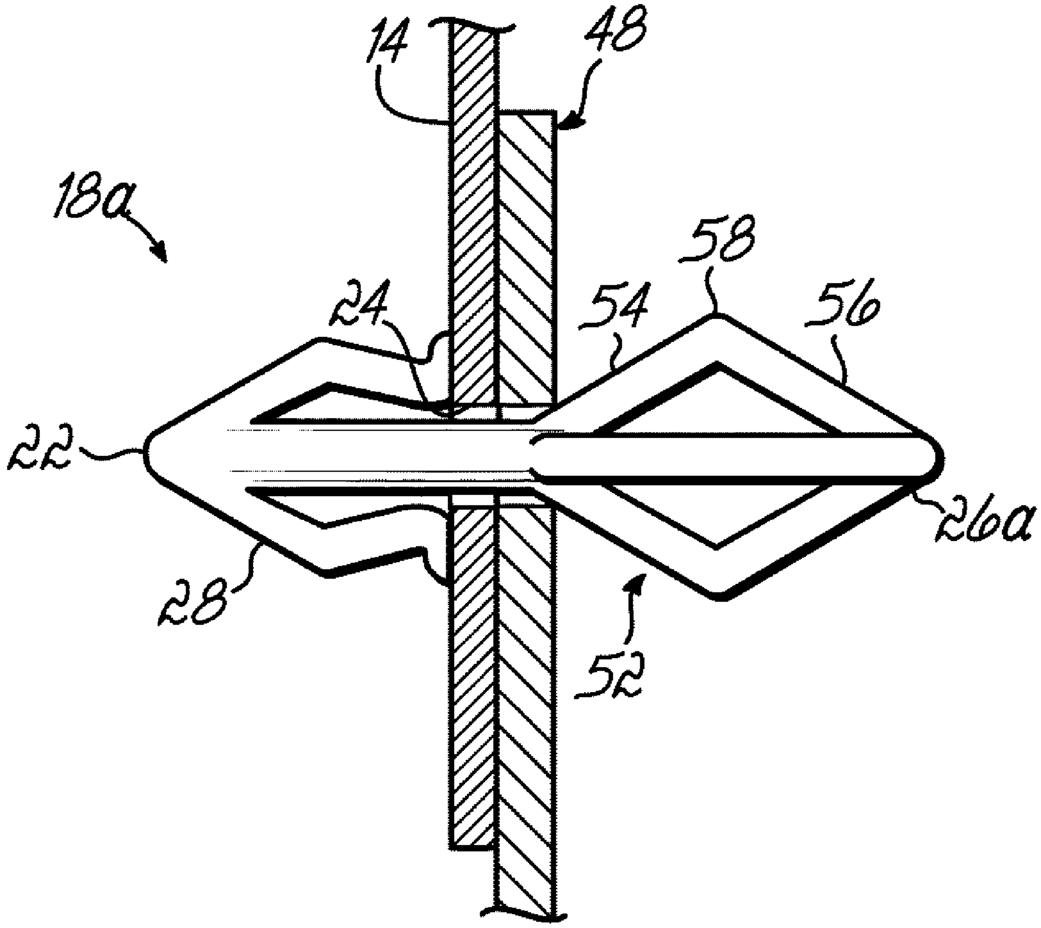
FIG. 5 is a partial cross-sectional view, similar to FIG. 4B, depicting another embodiment of a connecting member according to the present invention.

Referring to FIG. 5, there is shown another exemplary connecting member **18*a*. In this embodiment, the first engagement portion 22 includes the same resilient fingers 28, as described above with respect to the connecting member 18 of FIGS. 4A and 4B. The second engagement portion 26*a* includes one or more outwardly extending resilient toggle members 52. Each toggle member 52 has first and second elongate sections 54, 56 connected end-to-end and joined by a living hinge 58. The ends of the elongate sections 54, 56 opposite the living hinge 58 are interconnected to form a radially collapsible structure on the connecting member 18*a* for releasably engaging the interior trim panel 12 when the second engagement portion 26*a* is selectively engaged and disengaged from the interior trim panel 12. Specifically, the elongate sections 54, 56 pivot about living hinge 58 such that the toggle members 52 collapse toward one another when the second engagement portion 26*a* is installed through an aperture in the interior trim panel (not shown). The toggle members 52 spring outwardly once they pass through the aperture, in a manner similar to resilient fingers 28 of the first engagement portion 22. The toggle members 52 may, however, be pulled back through the aperture when it is desired to remove the interior trim panel 12 from the connecting member 18*a***.

While the connecting members **18, 18*a* have been shown and described herein as having resilient fingers 28, resilient discs 30, and toggle members 52, it will be recognized that the connecting member may have various other configurations such that the first engagement portion 22 is suited to be fixedly attached to the door frame 16 and the second engagement portion 26, 26*a* is suited to be releasably coupled to the trim panel 12**.

Advantageously, the connecting members 18 are received in the apertures 24 in the door frame 16 when the interior trim panel 12 is initially installed to the door frame 16 whereafter the connecting members 18 become fixedly attached to the door frame 16 such that upon subsequent removal of the interior trim panel 12 from the door frame 16 the interior trim panel 12 is released from the second engagement portions 26 of the connecting members 18 and the connecting members 18 remained fixed on the door frame 16 by the first engagement portions 22. The trim panel 12 may subsequently be reinstalled to and removed from the door frame 16, as may be required, to facilitate access to those portions of the door frame 16 located within the space between the interior trim panel 12 and an exterior panel or skin member 32 secured to the opposite side of the door frame 16.

Figure 2:
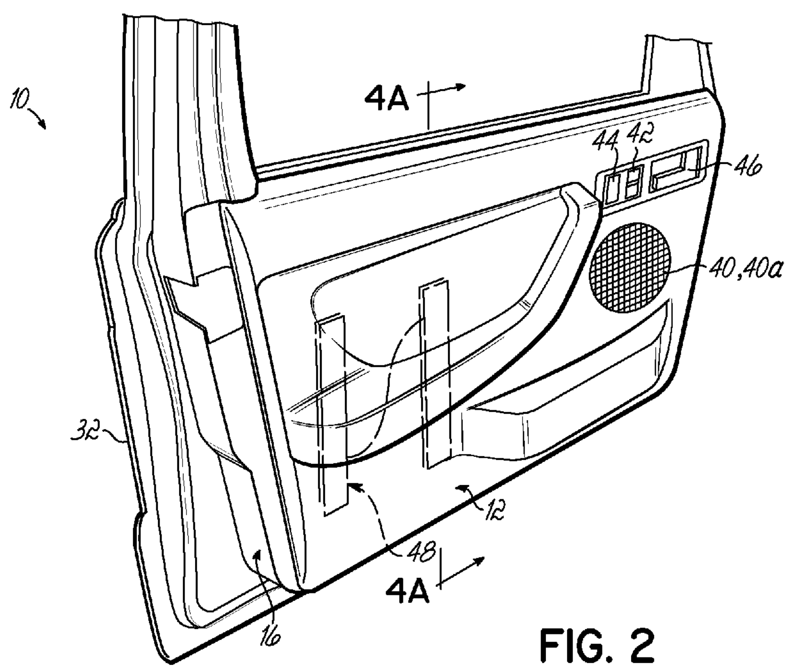
FIG. 2 is a perspective view of the door assembly of FIG. 1, with the interior trim panel installed to the door frame.

As depicted in FIG. 1, the interior trim panel 12 initially supports several door accessories which are to be assembled within the interior region of the door frame 16, such as an audio speaker 40, a door lock actuator 42, a window actuator 44, a door release mechanism 46, and a window regulator 48. The door accessories 40, 42, 44, 46, 48 are releasably secured to the outboard-facing surface 20 of the interior trim panel 12 by the second engagement portions 26 of the connecting members 18. Brackets (not shown) may be required to secure particular door accessories to the door frame 16 when the dimensions of the door accessory are greater than that which can be accommodated by the connecting member 18. The connecting members 18 are arranged so that the first engagement portions 22 extending from the door accessories 40, 42, 44, 46, 48 engage corresponding apertures **24*a* formed in the door frame 16 such that the door accessories become fixedly mounted to the door frame 16 when the interior trim panel 12 is initially assembled to the door frame 16, as described above and depicted in FIGS. 2 and 4A**.

Figure 3:
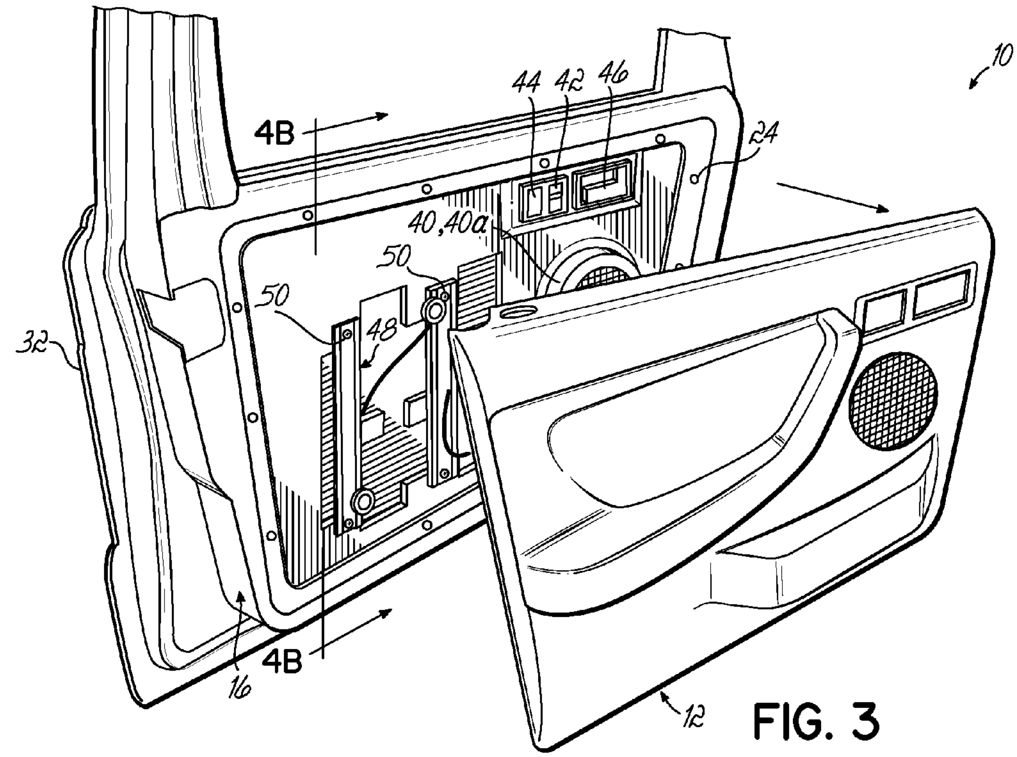
FIG. 3 is a perspective view of the door assembly of FIG. 2, depicting the interior trim panel removed after initial installation to the door frame.

Because the door accessories are fixedly attached to the door frame 16 by the first engagement portions 22 of the connecting members 18 and are only releasably coupled to the interior trim panel 12 by the second engagement portions 26 of the connecting members 18, the door accessories remain secured to the door frame 16 when the interior trim panel 12 is removed or otherwise moved away from the door frame 16, as depicted in FIGS. 3 and 4B. Unhindered access to the interior space on the door frame 16, between the exterior panel 32 and the interior trim panel 12 may be readily gained by moving the interior trim panel 12 away from the door frame in this manner. Thereafter, additional fasteners 50, such as threaded fasteners, may be installed between the door accessories 40, 42, 44, 46, 48 and the door frame 16 to more permanently secure the door accessories to the door frame 16 without interference from the interior trim panel 12.

It will be recognized that the interior trim panel 12 may be subsequently repositioned to engage the second engagement portions 26 of the connecting members 18 on the door frame 16. Moreover, the interior trim panel 12 may be subsequently removed from the door frame 16 to provide access to the door accessories as may be required, for example, to service the door accessories.

Advantageously, the modular interior trim panel 12 described above facilitates quick and easy assembly of an automotive door 10, including the door accessories, and is well suited for manufacturing assembly lines. Moreover, the interior trim panel 12 described above eliminates the need for a separate door bolster and thus the bolster section may be integrally formed with the interior trim panel 12. In addition, the audio speaker 40 may be provided with a unitary speaker grille **40*a*, eliminating the need to attach a separate grille to the interior trim panel 12**.

In another aspect of the invention, a method of assembling an automotive door 10 includes positioning a door accessory 40, 42, 44, 46, 48 on an interior trim panel 12, securing the door accessory to the interior trim panel 12 with a connecting member 18 as described above, and coupling the interior door trim panel 12 to a door frame 16 such that the door accessory is fixedly secured to the door frame 16 while the interior door trim panel 12 is selectively releasably secured to the door frame 16, separating the interior door trim panel 12 from the door frame 16 while retaining the door accessory on the door frame 16, and further securing the door accessory to the door frame 16 with an additional fastener 50.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive door assembly, comprising:

a door frame;

an interior trim panel selectively removably secured to said door frame to define a space therebetween;

a plurality of connecting members disposed between said door frame and said interior trim panel, each said connecting member including a first engagement portion fixedly attached to said door frame, and a second engagement portion selectively releasably attached to said interior trim panel; and a door accessory disposed between said door frame and said interior trim panel, said door accessory fixedly attached to said door frame by said first engagement portion of at least one of said connecting members, and selectively releasably coupled to said interior trim panel by said second engagement portion of said at least one connecting member.

2. The automotive door assembly of claim 1, wherein said door accessory is selected from one of an audio speaker, a door lock, a door lock actuator, a window actuator, a door release mechanism, and a window regulator.

3. The automotive door assembly of claim 1, wherein said first engagement portion of said connecting member comprises resilient fingers that firmly engage said door frame, and said second engagement portion comprises spaced, resilient discs in a tapered arrangement.

4. The automotive door assembly of claim 1, wherein said first engagement portion of said connecting member comprises outwardly extending resilient fingers engaging said door frame, and said second engagement portion comprises toggle members with first and second hingedly connected elongate sections extending radially outward to engage the interior trim panel.

5. An automotive trim assembly, comprising:

an interior door trim panel;

a door accessory supported on said interior door trim panel; and a plurality of connecting members coupling said door accessory to said interior door trim panel, each said connecting member including a first engagement portion fixedly attached to said door accessory, and a second engagement portion selectively releasably attached to said interior trim panel.

6. The automotive trim assembly of claim 5, wherein said connecting members are arranged on said interior door trim panel to fixedly attach said door accessory to an automotive door frame with said first engagement portions when said interior door trim panel is engaged with the door frame, and to release said interior door trim panel from the door frame while retaining said door accessory on the door frame when said interior door trim panel is moved to separate said interior door trim panel from the door frame.

7. The automotive trim assembly of claim 5, wherein said door accessory is selected from one of an audio speaker, a door lock, a door lock actuator, a window actuator, a door release mechanism, and a window regulator.

8. The automotive trim assembly of claim 5, wherein said first engagement portion of said connecting member comprises outwardly extending resilient fingers engaging said door frame, and said second engagement portion comprises spaced, resilient discs in a tapered arrangement.

9. The automotive trim assembly of claim 5, wherein said first engagement portion of said connecting member comprises outwardly extending resilient fingers engaging said door frame, and said second engagement portion comprises toggle members with first and second hingedly connected elongate sections extending radially outwardly to engage the interior trim panel.

10. A method of assembling an automotive door, comprising:

positioning a door accessory on an interior door trim panel;

securing the door accessory to the interior door trim panel with a connecting member having a first engagement portion fixedly engaging the door accessory and a second engagement portion releasably engaging the interior door trim panel; and coupling the interior door trim panel to a door frame with the first engagement portion of the connecting member such that the door accessory is fixedly secured to the door frame and the interior door trim panel is selectively releasably secured to the door frame.

11. The method of claim 10, further comprising:

separating the interior door trim panel from the door frame by releasing the interior door trim panel from the second engagement portion of the connecting member while retaining the door accessory on the door frame with the first engagement portion of the connecting member.

12. The method of claim 11, further comprising:

securing the door accessory to the door frame with an additional fastener.

13. The method of claim 10 wherein the first engagement portion comprises outwardly extending resilient fingers and the second engagement portion comprises spaced, resilient discs in a tapered arrangement, and wherein:

securing the door accessory to the interior door trim panel includes engaging the resilient fingers of the connecting member with the door accessory and engaging the resilient discs of the connecting member with the interior trim panel; and coupling the interior door trim panel to a door frame includes engaging the resilient fingers of the connecting member with the door frame.

14. The method of claim 13, wherein the door frame includes apertures formed therethrough, and engaging the resilient fingers of the connecting member with the door frame comprises:

inwardly compressing the resilient fingers through an aperture in the door frame; and expanding the resilient fingers outwardly of the aperture to engage the door frame.

15. The method of claim 10, wherein the first engagement portion comprises outwardly extending resilient fingers and the second engagement portion comprises toggle members with first and second hingedly connected elongate sections extending radially outward, and wherein:

securing the door accessory to the interior door trim panel includes engaging the resilient fingers of the first engagement portion with the door accessory and engaging the toggle members of the second engagement portion with the interior trim panel; and coupling the interior door trim panel to a door frame includes engaging the resilient fingers of the first engagement portion with the door frame.

* * * * *